United States Patent [19]
Hale et al.

[11] Patent Number: 5,642,141
[45] Date of Patent: *Jun. 24, 1997

[54] LOW ENERGY HEAT ACTIVATED TRANSFER PRINTING PROCESS

[75] Inventors: Nathan Hale; Ming Xu, both of Mt. Pleasant, S.C.

[73] Assignee: Sawgrass Systems, Inc., Mt. Pleasant, S.C.

[*] Notice: The term of this patent shall not extend beyond the expiration date of Pat. No. 5,488,907.

[21] Appl. No.: 695,121

[22] Filed: Aug. 5, 1996

Related U.S. Application Data

[63] Continuation-in-part of Ser. No. 565,999, Dec. 1, 1995, which is a continuation-in-part of Ser. No. 207,756, Mar. 8, 1994, Pat. No. 5,485,614, and a continuation-in-part of Ser. No. 506,896, Jul. 26, 1995, Pat. No. 5,568,805, which is a continuation-in-part of Ser. No. 299,736, Sep. 1, 1994, Pat. No. 5,488,907.

[51] Int. Cl.$^6$ ........................................ B41J 2/01
[52] U.S. Cl. ................................... 347/3; 347/213
[58] Field of Search ................... 347/213, 3; 400/120.2, 400/120.1

[56] References Cited

U.S. PATENT DOCUMENTS

| | | |
|---|---|---|
| 4,664,670 | 5/1987 | Mehl et al. . |
| 4,758,952 | 7/1988 | Harris, Jr. et al. . |
| 4,844,770 | 7/1989 | Mikoshiba et al. . |
| 4,882,593 | 11/1989 | Touma et al. . |
| 4,930,417 | 6/1990 | Isobe . |
| 4,987,120 | 1/1991 | Shiraishi et al. . |
| 5,010,352 | 4/1991 | Takei et al. . |
| 5,246,518 | 9/1993 | Idale . |
| 5,263,781 | 11/1993 | Mima et al. . |
| 5,275,646 | 1/1994 | Marshall et al. . |
| 5,279,655 | 1/1994 | Takazawa et al. . |
| 5,288,160 | 2/1994 | Li et al. . |
| 5,302,197 | 4/1994 | Wickramanayke et al. . |
| 5,310,778 | 5/1994 | Shor et al. . |
| 5,350,929 | 9/1994 | Meyer et al. . |
| 5,487,614 | 1/1996 | Hale ................................. 400/120.02 |
| 5,488,907 | 2/1996 | Xu et al. ........................... 400/120.01 |

FOREIGN PATENT DOCUMENTS

| | | |
|---|---|---|
| 351 794 | 1/1990 | European Pat. Off. . |
| 102390 | 6/1982 | Japan . |
| 2 095 855 | 10/1982 | United Kingdom . |
| 2 189 436 | 10/1987 | United Kingdom . |

*Primary Examiner*—Huan H. Tran
*Attorney, Agent, or Firm*—B. Craig Killough

[57] ABSTRACT

A method of printing a liquid ink which is produced from a heat activated dye which is selected from a limited group of dyes which are capable of transfer at low energy. A printer which uses liquid ink, such as an ink jet printer, prints an image onto an intermediate substrate medium. The dyes contained in the ink are not substantially activated during the process of printing on to the medium. The image formed by the printed ink is transferred from the medium to a final substrate by the application of heat and pressure for a short period of time to activate the ink. The dye and dispersing/emulsifying agent(s) are selected from a limited group to produce an ink which permits thermal transfer at low energy, with the resulting image, as deposited on the final substrate, having an optical density of 1.0 or greater.

23 Claims, 2 Drawing Sheets

LOW ENERGY HEAT ACTIVATED TRANSFER PRINTING PROCESS

This application is a continuation-in-part of Ser. No. 08/565,999, filed Dec. 1, 1995, which is a continuation-in-part of application Ser. No. 08/207,756 filed Mar. 8, 1994, U.S. Pat. No. 5,485,614, issued Jan. 30, 1996; This application is a continuation-in-part of Ser. No. 08/506,896, filed Jul. 26, 1995, now U.S. Pat. No. 5,568,805 which is a continuation-in-part of Ser. No. 08/299,736, filed Sep. 1, 1994, U.S. Pat. No. 5,499,907.

FIELD OF THE INVENTION

This invention relates to printing heat sensitive, dye diffusion or sublimation inks generally, and is more specifically related to a method of printing liquid inks comprising these dyes onto an intermediate transfer sheet by means of an ink jet printer or other printer which uses liquid inks, and subsequently transferring the printed image from the intermediate sheet by the application of heat and pressure.

BACKGROUND OF THE INVENTION

Words and designs are frequently printed onto clothing and other textile materials, and other objects. The use of computer technology allows substantially instantaneous printing of images. For example, video cameras or scanning may be used to capture an image to a computer. The image may then be printed by any suitable printing means, including mechanical thermal printers, ink jet printers and laser printers. These printers will print multiple color images.

Color ink jet printers are in common use. Color ink jet printers use combinations of cyan, yellow and magenta inks or dyes to produce multiple color images. Most ink jet printers in common use employ inks which are in liquid form.

Heat activated, dye diffusion and sublimation ink solids change to a gas at about 400° F., and have a high affinity for polyester and other synthetic materials at the activation temperature, and a limited affinity for most other materials. Once the bonding from gassification and condensation takes place, the ink is permanently printed, and is resistant to change or fading caused by laundry products, heat or light.

Hale., U.S. Pat. Nos. 5,246,518, 5,248,363, 5,302,223, and 5,485,614 and Hale et al., U.S. Pat. No. 5,488,907, disclose the use of printers to produce an image on a medium or transfer sheet wherein the image is comprised of sublimation, dye diffusion or other heat activated inks. The ink is not activated during the printing of the medium or transfer sheet.

Problems are associated with liquid inks prepared from insoluble dye solids. The orifices or nozzles of most ink jet printers are not designed for the dispensing of dye solids contained within a liquid material. The orifices of these printers are typically 5–30 microns in diameter, and clogging of the orifice will occur when ink solids of large particle size or in high volume are transferred through the orifice.

Further, when the ink solids are placed into a liquid carrier, the ink solids tend to separate from the liquid over time and fall to the bottom of the ink container. The ink is typically packaged in a container at a manufacturing facility for subsequent mounting of the container within the ink jet printer, meaning that a substantial storage time for the ink composition exists prior to use. Separation of the liquid and solids comprising the ink formulation presents problems with regard to the mechanical operation of the printer and the print quality achieved from use of the ink formulation. Agents which are included within the ink formulation to inhibit separation must also inhibit agglomeration of the solid dye particles, but the agents must not inhibit activation of the dye during the final transfer at elevated temperatures, by insulating the dye or reacting with the dye, or otherwise.

Accordingly, the production of stable liquid inks from dyes which are not water soluble is difficult to achieve without destroying or reducing the properties of the dye which are required for practicing the process of the invention. In the prior art, liquid inks have been produced from dyes that initially have properties suitable for practicing the process. However, the production of liquid inks from these dyes changes or masks the required properties, and therefore, the resulting inks cannot be satisfactorily used to practice the process. For example, additives which will inhibit the dye particles from settling out of the liquid carrier, or which will inhibit agglomeration, tend to insulate the dye particles, meaning that the energy required for sublimation, diffusion or activation of the dye is elevated to unacceptable levels for practicing the process. Other additives which are used in the prior art to produce a liquid ink from the solid dyes are reactive with the dye, and modify or eliminate required properties of the dyes. Other "side effects" of using these additives include undesired color modification or contamination, bonding with the intermediate substrate, or optical density on the final substrate which is inadequate.

While certain solvents will dissolve the dyes, the requirements of the process makes the use of these solvents impractical. Dye materials solubilized to the molecular level have a tendency to bond with fibers, both synthetic and natural. Accordingly, the dyes cannot be effectively transferred from a substrate used as an intermediate transfer sheet by the application of heat and pressure as required by the process of the present invention.

SUMMARY OF THE PRESENT INVENTION

This invention is a method of printing a liquid ink which is produced from sublimation, dye diffusion, or heat sensitive dyes. A printer which uses liquid ink, such as an ink jet printer, prints the image onto a medium, or intermediate substrate, which may be paper. The sublimation, dye diffusion, or heat sensitive dyes (hereinafter collectively referred to as "heat activated dyes") contained in the ink are not substantially sublimated or activated during the process of printing on to the medium. The image formed by the printed ink is transferred from the medium to a final substrate by the application of heat and pressure which sublimates or activate the ink. This thermal transfer step is achieved at low energy when compared to other sublimation or activation processes known and used in the art. One of the goals of the process requires that the thermal transfer occur by applying heat and pressure for no more than three and one-half minutes, and preferably less time. In the prior art, heat at the activation temperature is applied for up to thirty minutes. Accordingly, as used herein, a low energy transfer is a thermal transfer of the image from the intermediate sheet to the final substrate by applying a temperature which is not higher than 450° F., for no more than three and one-half minutes, with the resulting image, as deposited on the final substrate, having an optical density of 1.0 or greater, as measured by an X-Rite 418 densitometer in the density operation mode with background corrections.

The dyes, or perhaps pigments, which are suitable for practicing the invention are dyes which are capable of low energy transfer from the medium onto the final substrate to produce an image on the final substrate which is waterfast and colorfast. After transfer, the dyes are no longer substantially heat sensitive. Dyes which have these characteristics are found in various classifications of dyes, including disperse dyes, solvent dyes, basic dyes, acid dyes and vat dyes. However, none of the dyes which are currently available and which are suitable for producing a liquid ink for practicing the invention are soluble in water.

Accordingly, only a relatively small range of dyes in combination with a relatively small range of dispersing/ emulsifying agents will produce a stable liquid ink which will allow the printing method to be practiced. Characteristics of acceptable dyes and dispersing/emulsifying agents which will produce a liquid ink with which to practice the printing method are disclosed herein.

DETAILED DESCRIPTION OF THE PREFERRED EMBODIMENT

Figure 1:
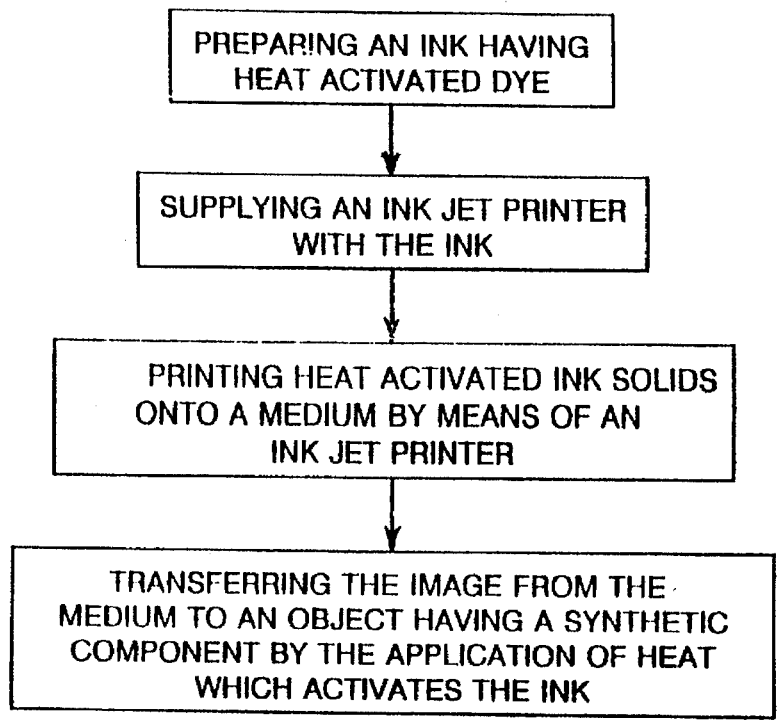
FIG. 1 is a block diagram showing the printing process.
Figure 2:
FIG. 2 illustrates an example of a design printed by a printer using the printing process.
Figure 3:
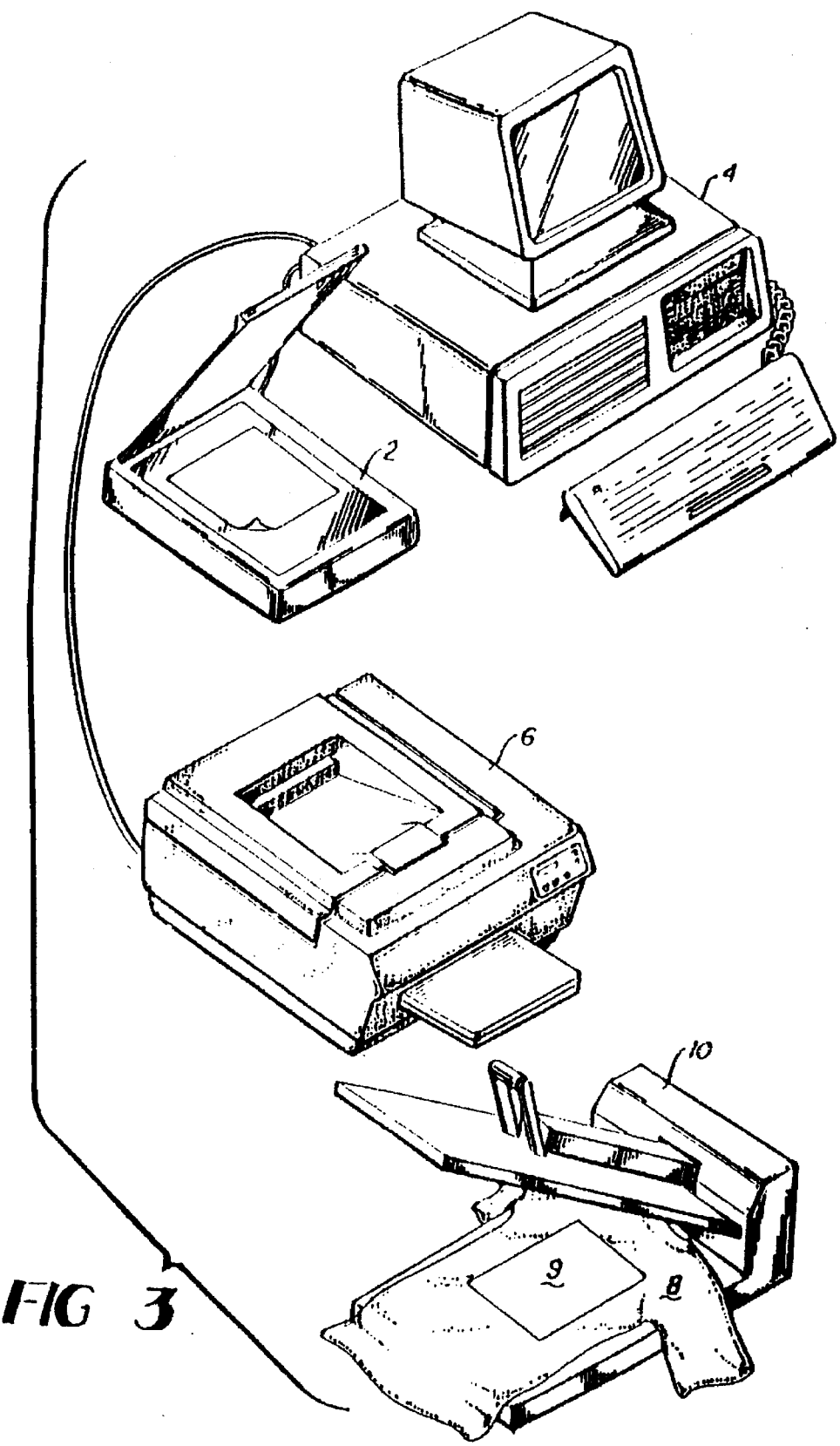
FIG. 3 is a diagrammatic illustration showing exemplary elements of computer and printing systems which could be used to achieve the printing process.

An image is input into a computer 4. The computer directs a printer 6 to print the image. Any means of forming the an image which may be printed from a computer may be used, including images generated by software. Available computer design graphic software may be used, or still photography may be used. The design may be photographic, graphic artistic, or simply letters or words. The use of cyan, yellow and magenta ink compositions allow the printer to print in full color or multi-color designs.

After the image is printed onto the medium, the image may be permanently transferred by thermal means. Most commonly, the design will be transferred onto a textile substrate, such as a shirt 8, although the image may be transferred onto other materials which act as a substrate, such as metal, ceramic, wood, or plastic. The design 3, which is printed onto the medium 9 without activating the ink, is placed against the object 8. A temperature which is sufficient to activate the dye is applied. This temperature will typically be around 400° F. This temperature is applied for a time sufficient to heat activate and transfer the ink solids in accordance with the requirements of the invention. A heat transfer machine 10 may be used to accomplish the transfer of the inks from the medium to the substrate. Activation, or sublimation, of the dye does not take place at the time of printing the image onto the medium, but occurs during the transfer from the medium to the substrate. The group of heat activated dyes from which dyes may be selected for use in the invention are dyes which substantially sublimate or activate at low energy to form an image which has an optical density value of no less than 1.0, and which is waterfast and colorfast. Each of the dyes which comprise this group will achieve an optical density of 1.25 or greater after activation, when optical density is measured by an X-Rite 418 densitometer in the density operation mode with background correction.

The invention requires the dyes to be transferred at low energy (as defined above) after the dyes are formulated into a liquid ink as described herein and printed onto the medium (the "acceptable dyes"). While a larger group of dyes can be sublimated at low energy, dyes which are not acceptable cannot be formulated into a liquid ink which retains the required properties. While most of the acceptable dyes are disperse dyes, certain other dyes which will perform according to the goals of the invention are included in the group of acceptable dyes.

In general, the acceptable dyes are not reactive, and do not have strong polar function groups, such as sulfonate or carboxyl groups. Reacting the dyes with chemical agents added to the formulation in order to form a liquid ink, as is sometimes done in the prior art, tends to inhibit the activation of the dyes at low energy, which is contrary to the present invention. The acceptable dyes have a molecular weight which is less than 600, and is preferably within a range of 200–400. Most of the acceptable dyes are disperse dyes but certain solvent dyes, vat dyes, basic or cationic dyes (such as carbinol base dyes or anthraquinone type dyes having a quarternary amine), acid dyes, direct dyes, mordant dyes and oxidizing colors also fall within the group of acceptable dyes.

The ink formulation prepared according to the invention is a liquid. Dye solids of small paricle size are dipsersed in a liquid carrier, and one or more agents are used to maintain what may be called, according to various definitions, a collodial, dispersion or emulsion system. The term "emulsion" is used herein to describe the system, even though the system could, in some forms, be called a colloid or a dispersion.

The heat activated solid dye particles are of small size. It is preferred that the individual solid dye particles have no dimension which is greater than 0.5 microns.

The solid dye particles are dispersed into the liquid carrier. The dispersion is normally achieved by the introduction of a dispersing agent, although mechanical or other physical means could be used. An emulsifying agent is introduced to prevent coagulation or coalescense of the individual dye particles and to stabilize the system.

As set forth in the examples, a single agent may be used as a dispersing and emulsifying agent. Multiple agents may be used in accordance with the goals of the invention. The agent or agents stabilize the system, so that the system remains sufficiently homogenous over time to allow successful printing and transfer of the dye according to the method of the invention. Further, the agent shields the individual particles from the adverse effects of the storage, transportation and printer environments, such as heat, cold and light. While the agent shields the dye particles while they are in the liquid system, it does not inhibit low energy transfer of the dyes in the form of the printed image.

The agents used to disperse and or emulsify the dye particles include various dispersant materials, surfactants (including cationic, anionic, amphoteric, and nonionic suffactants) and polymeric surfactants. Polymeric materials with dispersing ability, but which are not surfactants, can also be used. Either synthetic or natural materials can be used. The dispersing/emulsifying agents each have a molecular weight which is less than 100,000, and preferably less than 10,000. Thermal stability of the agents is essential to prevent decomposition and/or chemical reaction between the agents and the other components in the systems.

As with the dye, to accomplish the printing method of the invention, the agent(s) do not have active function groups which will react or crosslink with the medium, or which will react or crosslink with the dye or pigment in the system, since such reactions or linkages inhibit the required properties of the dye at the time of activation. The agent(s) must form the emulsion from the finely divided dye particle and the liquid carrier, but must not materially insulate or otherwise materially inhibit the activation of the dye at the time of final transfer.

Agents having the required properties when used with some or all of the acceptable dyes include Lignosulfonate products such as Marasperse 52CP (Lignotech), Lignosol FTA (Lignotech), Lignosol SFX-65 (Lignotech), Maprasperse CBA-1 (Lignotech), Temsperse S002 (Temfibre, Inc.) Stepsperse DF series (Stephan Co.), and Weschem NA-4 (Wesco Technologies, LTD), Kraft lignin products such as Diwatex XP (Lignotech), and Reax 85 (Westvaco), and oxylignin products such as Marasperse CBOS-6 and Vanisperse CB.

Other examples of emulsifying agents and dispersants are alkylaryl polyether alcohol nonionic surfactants, such as Triton X series (Octylphenoxypolyethoxyethanol); alkylamine ethoxylates nonionic surfactants such as Triton FW series, Triton CF-10, and Tergitol (Union Carbide Chemicals); polysorbate products such as Tween (ICI Chemicals and Polymers); polyalkylene and polyalkylene modified surfactants, such as Silwet surfactants (polydimethylsioxane copolymers) and CoatOSil surfactants from OSI Specialties; alcohol alkoxylates nonionic surfactants, such as Renex, BRIJ, and Ukanil; Sorbitan ester products such as Span and Arlacel; alkoxylated esters/PEG products, such as Tween, Atlas, Myrj and Cirrasol surfactants from ICI Chemicals and Polymers; unsaturated alcohol products such as surfynol series surfactants from Air Products Co., alkyl phosphoric acid ester surfactant products, such as amyl acid phosphate, Chemphos TR-421; alkyl amine oxide such as Chemoxide series from Chemron Corporation; anionic sarcosinate surfactants such as Hamposyl series from Hampshire Chemical corporation; glycerol esters or polyglycol ester nonionic surfactants such Hodag series from Calgene Chemical, Alphenate (Henkel-Nopco), Solegal W (Hoechst AG), Emultex (Auschem SPA); and polyethylene glycol ether surfactants such as Newkalgen from Takemoto Oil and Fat Co.

Multiple agents may be used in combination to improve the emulsification of the system and to stabilize the system, as long as the agents are not reactive and do not cause precipitation or otherwise negatively impact upon the emulsification process or the transfer process.

Organic solvents, cosolvents, and/or humectants can also be used as additional additives. Aliphatic and/or aromatic alcohols (thioalcohols), alkoxylated alcohols (thioalcohols), halogenated alcohols (thioalcohols) and carboxylated alcohols (thioalcohols), including mono-alcohol (thioalcohol), diol (thiodialcohol), triol (thiotrialcohol) and polyol (thiopolyalcohol), aminoxide, diamine, triamine material, may be used to improve dye dispersibility, solubility and/or stability in the final ink composition. Examples of solvent materials are diethylene glycol, DMSO and dipropylene glycol.

Other additives can also be introduced into the ink, such as surfactants, corrosion control agents, foam control agents, antioxidants, radiation stabilizers, thermal stabilizers, flame retarding agents, pH control agents, viscosity control agents, or surface (interfacial) tension control agents can be added during or after the emulsification process. Other materials, including dispersants, emulsifying agents, and stabilizers, may be included in the formulation by means of methods known in the art.

An example of a liquid ink composition usable in an ink jet printer is as follows:

| Material | Weight % |
| --- | --- |
| heat sensitive dye(s) | 0.05–20% |
| dispersant/emulsifying agent | 0.05–30% |
| solvent(s)/cosolvent(s) | 0–45% |
| additive(s) | 0–15% |
| water | 40–98% |
| Total | 100% |

EXAMPLES

Example 1

30 grams of finely divided Spirit Blue Base (CAS# 68389-46-8) is mixed with 15 grams of Ultrazine NA (Lignotech, USA) and 500 grams of de-ionized water. An ultrasonic pulverizer is used to disperse the dye into the aqueous phase for approximately 30 minutes. Two (2.0) grams of Solsperse 27000 (Zenica Colors, USA) is added into the mixture, which is pulverized for another 10 minutes to achieve a stable emulsion. The mixture is filtered to remove particles larger than 0.25 microns. The printing ink for use in the ink jet printer is formulated from the emulsion as follows:

| Material | Weight % |
| --- | --- |
| Emulsion | 87.0 |
| Glycol | 4.0 |
| 1-methoxy-2-propanol | 7.0 |
| Ammonyx LO (1) | 2.0 |
| Total | 100% |

(1). Stepan Co

The resulting ink is printed by the HP 560 Deskjet printer onto plain copy paper in a dark cyan color, and is transferred from the paper medium or receiver onto a polyester fabric substrate by thermal transfer at 400° F. temperature with 40 lb. pressure applied for 20 seconds. The image as applied to the polyester fabric substrate has an optical density value of 1.4–1.5 for the cyan color as read by an X-Rite 418 densitometer.

Example 2

Twenty (20) grams of Disperse Yellow 9 (CAS# 6373-73-5) is mixed with four (4) grams of Sulfynol 131 (Air Products) and 5.0 grams of glycerol (CAS# 56-81-5) and 480 grams of de-ionized water. The pulverizer is used to disperse the dye into the aqueous phase for approximately 25 minutes. One (1.0) gram of Sulfynol 104 E (Air Products) is added to the mixture and pulverized for another 10 minutes to produce an emulsion. The mixture is filtered to remove particles larger than 0.25 microns. The liquid ink for use in the ink jet printer is formulated as follows:

| Material | Weight % |
| --- | --- |
| Emulsion | 78.5 |
| Diethylene Glycol | 8.0 |
| Thiodiethanol | 5.0 |
| Sulfynol 465 | 4.0 |

-continued

| Material | Weight % |
| --- | --- |
| 1-2-Propandiol | 4.0 |
| DEA | 0.5 |
| Total | 100% |

The resulting liquid ink is printed by a Canon Bubble Jet 4100 printer onto plain copy paper. The printed image is thermally transferred from the paper medium to a polyester textile substrate at 400° F., while applying 40 lb. pressure for 20 seconds. An intense yellow color having an optical density of 1.4, as measured by an X-Rite 418 densitometer with background correction, appears on the substrate.

Example 3

Twenty-five (25) grams of finely divided Solvent Red 52 (CAS# 81-39-0), is mixed with twenty-two (22) grams of Transferin® N-38 (Boehme Filatex, Inc.) and one hundred and fifty (150) grams of de-ionized water. An ultrasonic pulverizer is used to finely divide the dye and to disperse and micronize the solid dye particles into the aqueous phase by operating the pulverizer for approximately Forty-five (45) minutes. Five (5) grams of Tergitol™ 15-S-15 (Union Carbide, USA), Ten (10) grams of 1,4-butanediol, and two hundred and twenty (220) grams of de-ionized water are then added into the dispersion and pulverized for an additional ten (10) minutes. The dispersion is then filtered to remove solid particulate having a dimension which is larger than 0.25 microns. A liquid ink is formulated using the homogenized emulsion as follows:

| Component | Weight % |
| --- | --- |
| Emulsion | 85.0 |
| Tergitol ™ 15-S-9[1] | 3.997 |
| 1-pyrrolidinone | 2.0 |
| 1-ethoxy-2-propanol | 6.0 |
| IPA | 3.0 |
| Kathon ® PFM[2] | 0.003 |
| Total | 100 |

[1]Union-Carbide, USA
[2]Rohm & Haas Company

The liquid ink is then printed by an Epson Stylus Color Pro or Epson Stylus Color IIs piezo electric ink jet printer to form an image on plain copy paper. The image is transferred from the paper to a polyester fabric substrate by the application of pressure and heat at a temperature of 400° F. for 25 seconds. The image as transferred has an optical density of 1.45 for the magenta color, as measured by an X-Rite 418 densitometer with background correction.

What is claimed is:

1. A method of printing dye by means of a printer which uses liquid ink, comprising the steps of:
   a. preparing a liquid ink formulation comprising a heat activated dye, a liquid carrier, and at least one agent which disperses and emulsifies said heat activated dye, wherein said heat activated dye activates upon the application of heat at or greater than the activation temperature for 210 seconds or less, and wherein said at least one agent does not substantially increase the activation energy required to activate said heat activated dye after said heat activated dye is printed onto a medium;
   b. supplying a printer with said liquid ink formulation;
   c. printing said liquid ink formulation by means of said printer to form an image on a medium without materially activating the heat activated dye; and
   d. transferring said image from said medium to a substrate on which the image is to appear by the application of heat and pressure at a temperature which is sufficient to activate the heat activated dye for 210 seconds or less, so as to cause the heat activated dye to transfer on to said substrate.

2. A method of printing using heat activated dye solids by means of a printer which uses liquid ink, as described in claim 1, wherein said heat activated dye is not reactive with said at least one agent and said liquid carrier.

3. A method of printing using heat activated dye solids by means of a printer which uses liquid ink, as described in claim 1, wherein said heat activated dye is substantially insoluble in said liquid carrier.

4. A method of printing using heat activated dye solids by means of a printer which uses liquid ink as described in claim 1, wherein said at least one agent shields said heat activated dye but does not substantially increase the activation energy required to activate said heat activated dye after said heat activated dye is printed on to said medium.

5. A method of printing using heat activated dye solids by means of a printer which uses liquid ink as described in claim 1, wherein said heat activated dye has a molecular weight in the range of 200 to 400.

6. A method of printing using heat activated dye solids by means of a printer which uses liquid ink, as described in claim 1, wherein said heat activated dye is not reactive with said at least one agent and said liquid carrier.

7. A method of printing using heat activated dye solids by means of a printer which uses liquid ink, as described in claim 1, wherein said at least one agent is not reactive with said heat activated dye and does not react with said medium and does not link with said medium.

8. A method of printing using heat activated dye solids by means of a printer which uses liquid ink, as described in claim 1, wherein said heat activated dye is comprised of individual particles of said heat activated dye, and wherein said individual particles of said heat activated dye do not have a dimension which is greater than 0.5 microns.

9. A method of printing using heat activated dye solids by means of a printer which uses liquid ink according to the method of claim 1, further comprising the steps of: preparing a second liquid ink formulation comprising a heat activated dye of a second color, a liquid carrier, and at least one agent which disperses and emulsifies said heat activated dye of a second color, wherein said heat activated dye of a second color activates upon the application of heat at or greater than the activation temperature for 210 seconds or less, and wherein said at least one agent does not substantially increase the activation energy required to activate said heat activated dye of a second color after said heat activated dye of a second color is printed onto a medium; preparing a third liquid ink formulation comprising a heat activated dye of a third color, a liquid carrier, and at least one agent which disperses and emulsifies said heat activated dye of a third color, wherein said heat activated dye of a third color activates upon the application of heat at or greater than the activation temperature for 210 seconds or less, and wherein said at least one agent does not substantially increase the activation energy required to activate said heat activated dye of a third color after said heat activated dye of a third color is printed onto a medium; supplying said printer with said second liquid ink formulation and said third liquid ink formulation; printing said second liquid ink formulation and said third liquid ink formulation by means of said printer along with said liquid ink formulation to form said image in multiple colors on said medium without materially activating said heat activated dye, said heat activated dye of a second color or said heat activated dye of a third color.

10. A method of printing a design by means of a computer driven printer using heat activated dye solids, comprising the steps of:
   a. preparing an ink formulation comprising a heat activated dye, a liquid carrier, and at least one agent which disperses said heat activated dye in said liquid carrier and forms an emulsion from said heat activated dye and said liquid carrier, wherein said heat activated dye activates at an activation energy of not greater than 450° F. applied for not more than 210 seconds, and wherein said at least one agent does not substantially increase the activation energy required to activate said heat activated dye after said heat activated dye is printed on to a medium, and wherein said heat activated dye is a solid and is substantially insoluble in said liquid carrier;
   b. supplying a printer with said liquid ink formulation;
   c. printing said liquid ink formulation by means of said printer to form an image on a medium without materially activating the heat activated dye; and
   d. transferring said image by thermal means from said medium to a substrate on which the image is to appear at a temperature of not greater than 450° F. applied with pressure for not more than 210 seconds, so as to cause the heat activated dye to transfer onto said substrate.

11. A method of printing using heat activated dye solids by means of a printer which uses liquid ink as described in claim 10, wherein said at least one agent shields said heat activated dye but does not substantially increase the activation energy required to activate said heat activated dye after said heat activated dye is printed on to said medium.

12. A method of printing using heat activated dye solids by means of a printer which uses liquid ink as described in claim 10, wherein said heat activated dye has a molecular weight in the range of 200 to 400.

13. A method of printing using heat activated dye solids by means of a printer which uses liquid ink, as described in claim 10, wherein said heat activated dye is not reactive with said at least one agent and said liquid carrier.

14. A method of printing using heat activated dye solids by means of a printer which uses liquid ink, as described in claim 10, wherein said at least one agent is not reactive with said heat activated dye and does not react with said medium and does not link with said medium.

15. A method of printing using heat activated dye solids by means of a printer which uses liquid ink, as described in claim 10, wherein said heat activated dye is comprised of individual particles of said heat activated dye, and wherein said individual particles of said heat activated dye do not have a dimension which is greater than 0.5 microns.

16. A method of printing using heat activated dye solids by means of a printer which uses liquid ink, according to the method of claim 10, further comprising the steps of: preparing a second liquid ink formulation comprising a heat activated dye of a second color, a liquid carrier, and at least one agent which forms an emulsion from said heat activated dye of a second color and said liquid carrier, wherein said heat activated dye of a second color activates at an activation energy of not greater than 450° F. applied for not more than 210 seconds, and wherein said at least one agent does not substantially increase the activation energy required to activate said heat activated dye of a second color after said heat activated dye of a second color is printed on to a medium, and wherein said heat activated dye of a second color is a solid and is substantially insoluble in said liquid carrier; preparing a third liquid ink formulation comprising a heat activated dye of a third color, a liquid carrier, and at least one agent which forms an emulsion from said heat activated dye of a third color and said liquid carrier, wherein said heat activated dye of a third color activates at an activation energy of not greater than 450° F. applied for not more than 210 seconds, and wherein said at least one agent does not substantially increase the activation energy required to activate said heat activated dye of a third color after said heat activated dye of a third color is printed on to a medium, and wherein said heat activated dye of a third color is a solid and is substantially insoluble in said liquid carrier; supplying said printer with said second liquid ink formulation and said third liquid ink formulation; printing said second liquid ink formulation and said third liquid ink formulation by means of said printer along with said liquid ink formulation to form said image in multiple colors on said medium without materially activating said heat activated dye, said heat activated dye of a second color or said heat activated dye of a third color.

17. A method of printing a design by means of a computer driven printer using heat activated dye solids, comprising the steps of:
   a. preparing an ink formulation comprising a heat activated dye, a liquid carrier, and at least one agent which disperses said heat activated dye in said liquid carrier and forms an emulsion from said heat activated dye and said liquid carrier, wherein said heat activated dye activates at an activation energy of not greater than 450° F. applied for not more than 210 seconds, and wherein said at least one agent does not substantially increase the activation energy required to activate said heat activated dye after said heat activated dye is printed onto a medium, and wherein said heat activated dye is a solid and is substantially insoluble in said liquid carrier;
   b. supplying a printer with said ink formulation;
   c. printing said liquid ink formulation by means of said printer to form an image on a medium without materially activating the heat activated dye; and
   d. transferring said image by thermal means from said medium to a substrate on which the image is to appear at a temperature which is not greater than 450° F. applied with pressure for not more than 210 seconds, so as to cause the heat activated dye to transfer onto said substrate in the form of said image, wherein said image as transferred on to the substrate has an optical density of 1.0 or greater, as measured by an X-Rite 418 densitometer in the density operation mode with background corrections.

18. A method of printing using heat activated dye solids by means of a printer which uses liquid ink as described in claim 17, wherein said at least one agent shields said heat activated dye but does not substantially increase the activation energy required to activate said heat activated dye after said heat activated dye is printed on to said medium.

19. A method of printing using heat activated dye solids by means of a printer which uses liquid ink as described in claim 17, wherein said heat activated dye has a molecular weight in the range of 200 to 400.

20. A method of printing using heat activated dye solids by means of a printer which uses liquid ink, as described in claim 17, wherein said heat activated dye is not reactive with said at least one agent and said liquid carrier.

21. A method of printing using heat activated dye solids by means of a printer which uses liquid ink, as described in claim 17, wherein said at least one agent is not reactive with said heat activated dye and does not react with said medium and does not link with said medium.

22. A method of printing using heat activated dye solids by means of a printer which uses liquid ink, as described in claim 17, wherein said heat activated dye is comprised of individual particles of said heat activated dye, and wherein said individual particles of said heat activated dye do not have a dimension which is greater than 0.5 microns.

23. A method of printing using heat activated dye solids by means of a printer which uses liquid ink, according to the method of claim 17, further comprising the steps of: preparing a second liquid ink formulation comprising a heat activated dye of a second color, a liquid carrier, and at least one agent which forms an emulsion from said heat activated dye of a second color and said liquid carrier, wherein said heat activated dye of a second color activates at an activation energy of not greater than 450° F. applied for not more than 210 seconds, and wherein said at least one agent does not substantially increase the activation energy required to activate said heat activated dye of a second color after said heat activated dye of a second color is printed on to a medium, and wherein said heat activated dye of a second color is a solid and is substantially insoluble in said liquid carrier; preparing a third liquid ink formulation comprising a heat activated dye of a third color, a liquid carrier, and at least one agent which forms an emulsion from said heat activated dye of a third color and said liquid carrier, wherein said heat activated dye of a third color activates at an activation energy of not greater than 450° F. applied for not more than 210 seconds, and wherein said at least one agent does not substantially increase the activation energy required to activate said heat activated dye of a third color after said heat activated dye of a third color is printed on to a medium, and wherein said heat activated dye of a third color is a solid and is substantially insoluble in said liquid carrier; supplying said printer with said second liquid ink formulation and said third liquid ink formulation; printing said second liquid ink formulation and said third liquid ink formulation by means of said printer along with said liquid ink formulation to form said image in multiple colors on said medium without materially activating said heat activated dye, said heat activated dye of a second color or said heat activated dye of a third color.

\* \* \* \* \*